W. E. HOSCH.
COUNTER ATTACHMENT.
APPLICATION FILED AUG. 16, 1917. RENEWED FEB. 3, 1919.
1,312,693.
Patented Aug. 12, 1919.
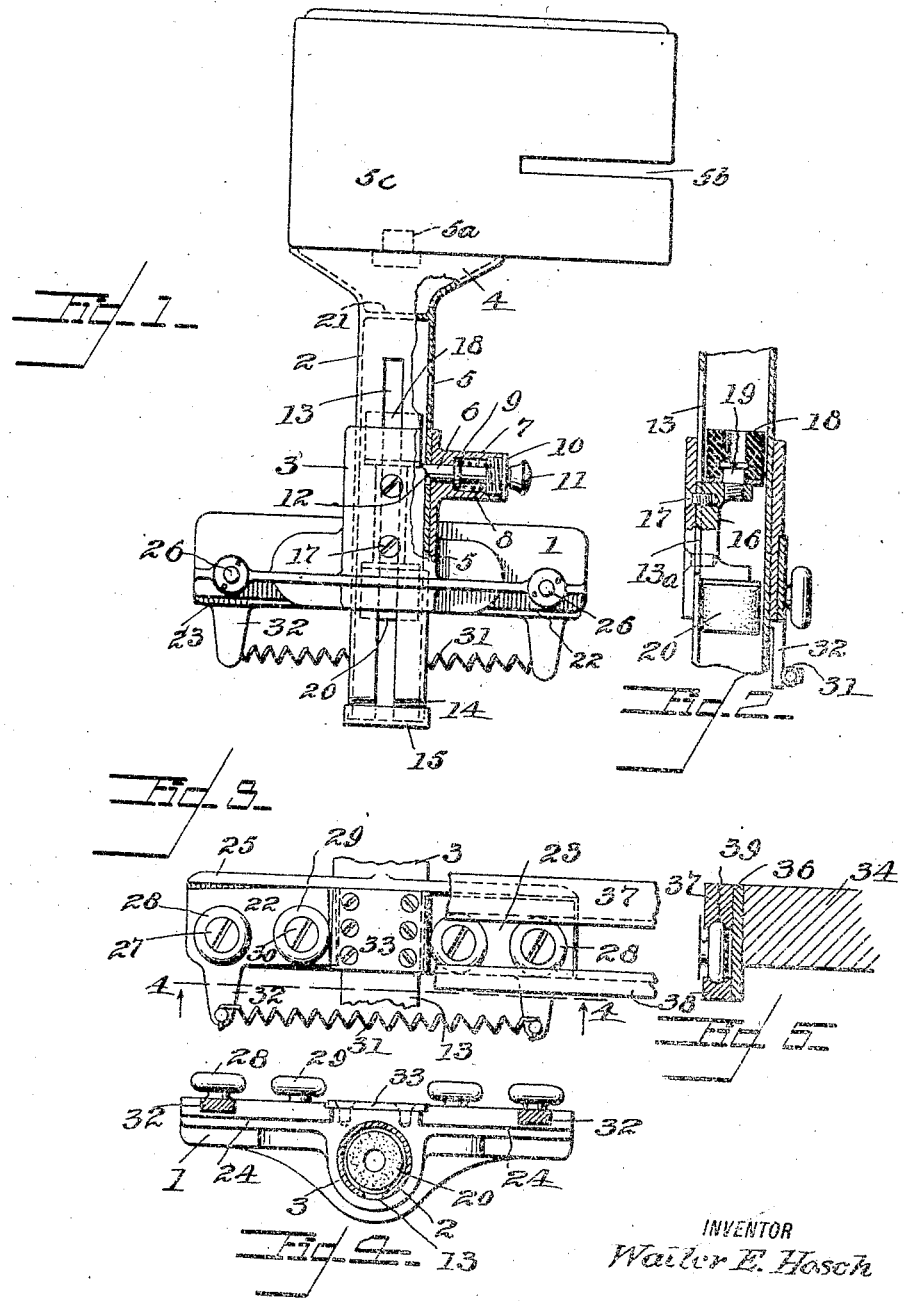
INVENTOR
Walter E. Hosch
BY
[signature]
his ATTORNEY

UNITED STATES PATENT OFFICE.

WALTER E. HOSCH, OF ST. LOUIS, MISSOURI; ANNIE MAE HOSCH, ADMINISTRATRIX OF SAID WALTER E. HOSCH, DECEASED, ASSIGNOR TO THE MEASUREGRAPH COMPANY, OF ST. LOUIS, MISSOURI, A CORPORATION.

COUNTER ATTACHMENT.

1,312,693.  Specification of Letters Patent.  Patented Aug. 12, 1919.

Application filed August 16, 1917, Serial No. 186,483. Renewed February 3, 1919. Serial No. 274,802.

*To all whom it may concern:*

Be it known that I, WALTER E. HOSCH, a citizen of the United States, residing in the city of St. Louis and State of Missouri, have invented new and useful Improvements in Counter Attachments, of which the following is a specification.

This invention relates to a counter attachment intended to be used as a support for a salesman's accessory, such as a cloth measuring machine. In a certain type of cloth measuring machines the instrument is movably supported on the counter so that it may be moved along the counter to any point where it is most convenient to use the machine. The instrument is usually supported so that it can be rotated in a horizontal plane to enable the cloth to be pulled through the throat of the measuring machine in a direction parallel with the length of the counter, or at right angles thereto. In the first instance, if the instrument is mounted to slide along the counter, the tension in the cloth exerts a tendency to move the instrument bodily along the counter. Such a movement must be prevented. Furthermore, as bolts of cloth or other articles on the counter may interfere with the act of drawing the cloth through the instrument, it is desirable to mount the device in such a way that it can be raised and held at a considerable height above the counter.

The general object of this invention is to produce a support for such an instrument which will meet these requirements, and which will provide simple means for supporting the measuring instrument so that it can be readily held at different elevations; and further to provide a construction which will enable the instrument to be readily shifted along the counter if sufficient force be applied to it for that purpose; at the same time, the parts are so organized that the instrument will offer a sufficient resistance to prevent its being moved along the counter simply by the tension in the cloth when being pulled through the instrument. Further objects of the invention will appear hereinafter.

In the drawing which fully illustrates the preferred embodiment of my invention, Figure 1 is a front elevation partially broken away to illustrate the details of the construction;

Fig. 2 is a vertical section partly broken away, taken through the bracket, and its contiguous parts, as viewed in a plane disposed at right angles to the plane of projection in Fig. 1, Fig. 3 is an elevation of the bracket showing its inner face and indicating its relation to the guide rails along which the bracket may slide;

Fig. 4 is a section taken on the line 4—4 of Fig. 3; and

Fig. 5 is a vertical cross-section through the rail and the adjacent portion of the counter, to indicate the manner in which the attachment engages the rails.

Referring more particularly to the parts, my attachment preferably comprises a bracket 1, which is elongated in a horizontal direction and formed at a suitable point with guiding means for vertically guiding a post 2. For this purpose the bracket is preferably provided with a centrally disposed guide sleeve 3, through which the post 2 slides. The upper end of the post 2 is formed into a head 4, upon which the cloth measuring machine or other instrument 5ᶜ is mounted.

Suitable means is provided to enable the post 2 to be held in a plurality of different vertically adjusted positions. For this purpose I form the side of the post with a plurality of recesses or openings 5 disposed at intervals along one side, and the bracket is provided with means for engaging any one of these recesses to support the post. This means includes a locking bolt or pin 6 which is mounted in a suitable housing 7 on the side of the sleeve 3, and I also provide means for pressing this locking means or bolt 6 toward the post so that its end will snap into any one of the recesses 5 as the post slides through the bracket. For this purpose the coil spring 8 is provided, which thrusts against the collar 9 on the bolt, the back end of the spring thrusting against a plug 10 screwed into the end of the housing. The outer end of the bolt has an enlarged head 11, by means of which the bolt can be pulled outwardly to release it from the post. I prefer to construct this locking means in such a way that it will permit the free movement of the post 2 in an upward direction, but will operate to support the post in any of the adjusted positions. For this purpose I prefer to form the front and lower side of the bolt with an inclined or beveled face 12. With this construction it is evident that if the post is pulled upwardly the lower edge of the opening or recess 5 which is in engagement with the locking bolt will engage the beveled face 12, and force the bolt back. In this way the post can be pulled up to any height desired and will lock itself automatically at any point corresponding to the positions of the recesses or opening 5.

The post is preferably of tubular form. In order to prevent the post from rotating so as to maintain the recesses 5 in alinement with the bolt 6, I provide the wall of the post with a longitudinal slot 13. This slot may run to the extreme lower end of the post, at which point the post is provided with threads 14 to which a suitable cap 15 may be secured.

Within the tubular post a member or block 16 is provided which is connected to the sleeve 3 through the slot 13 by means of any suitable fastening device such as the screws 17. If desired this member may be formed with a tongue 13$^a$ running in the slot. This will evidently operate to guide the post at the slot 13, and prevent its rotating on its longitudinal axis. This member 16 is also utilized to arrest or limit the up and down movement of the post, and for this purpose it should carry cushions. This feature is advisable in order to prevent any sudden jar to the instrument 5$^c$ in case the bolt 6 should be withdrawn, and the instrument not held up by one's hand. For this purpose the upper end of the member 16 is provided with a buffer 18 which may be in the form of a short piece of heavy rubber tube held in place by a screw 19. A similar buffer 20 is provided at the lower end of the member 16. With this construction evidently if the post should drop down the buffer 18 will eventually be engaged by a head 21, which is formed at the upper end of the post, and in this way the jar of the descent of the instrument will be relieved. Similarly, if the instrument is suddenly pulled up, the screw cap 15 would eventually engage the buffer 20 and relieve the shock at the limit of the upward movement of the post.

I provide means for guiding the counter attachment along the counter so as to enable it to be brought to any point desired on the length of the counter. This means is constructed in such a way that the bracket will be securely held, but in such a way that if sufficient force is exerted upon it, it can be moved along the counter. In order to get this effect, I prefer to provide two shoes 22 and 23 which are movably secured to alining vertical faces 24 on the bracket. The upper edges of these shoes are disposed just below a horizontal flange 25, which extends longitudinally from end to end of the bracket. The outer portion of each shoe is pivotally mounted on a pivot or stud 26 attached to the bracket and which has a screw head 27 on the exposed side of the shoe. Each of these studs operates also as a pivot for a roller 28. In addition to this each shoe carries another roller 29 which is secured in the shoe on a suitable screw or stud 30.

Suitable means is provided tending to move these shoes in such a way as to hold the rollers 29 out of alinement with the rollers 28. For this purpose I prefer to use a spring 31 which is attached to short arms 32 extending down from the outer portions of the shoes. The skew position of the shoe 22 at the left of Fig. 3 indicates the effect of the spring pull on the shoes when the bracket is not attached to the guide track. Evidently this effect is to swing the shoe 22 toward the left on its pivot as far as the flange 25 will permit. In order to hold the shoes 22 and 23 more securely in place I prefer to let their inner edges extend under a cover plate 33. (See Fig. 4.) The bracket constructed substantially as described may be guided along the edge of a counter 34 by means of a track. This track may comprise a back plate 36, an upper rail 37, and a lower rail 38. The rollers have curved faces which fit neatly in the curved or half round grooves 39 which are formed in the adjacent edges of the rails. By pulling the arms 32 apart to overcome the force of the spring the rollers 29 may be brought into substantial alinement with the rollers 28. This will enable all the rollers to pass into the guide space between the rails 37 and 38. When this has been done evidently the force of the spring will operate to hold the rollers 29 securely against the upper rail 27, and the rollers 28 securely against the lower rail. As a matter of fact there is very little difference between the diameter of the rollers and the distance between the adjacent faces of the rails so that the clearance is hardly perceptible. It will be evident however that the rails will effectively guide the bracket when it is being slid to and fro. It will also be evident that the effect of the spring will be to offer a substantial resistance to the movement of the bracket along the rails, so that the bracket tends to stay where it is put; and furthermore, it will not move along the rails unless a substantial force is exerted upon it for that purpose. This is an important feature because the cloth is generally drawn through the measuring device in a direction extending longitudinally with the counter, and unless the bracket offers a considerable resistance, evidently the instrument might be pulled along the counter by the tension of the cloth instead of having its driving mechanism rotated.

In this connection it should be understood that the measuring instrument 5ᶜ is rotatable on the head of the post on a pivot 5ᵃ. In Fig. 1, the instrument is in position to have the cloth pulled through the throat 5ᵇ in a direction at right angles to the length of the counter; but under normal conditions the instrument is held on the post in a position at right angles to that illustrated, and in that position the counter attachment must resist the pull of the cloth or else it will be pulled along the track in the manner suggested above.

It is understood that the embodiment of my invention set forth in the above specification is only one of the many embodiments my invention may take, and I do not wish to be limited in the practice of my invention, nor in my claims, to the particular embodiment set forth.

What I claim is:—

1. A counter attachment for supporting a salesman's accessory, comprising the combination of a bracket having movably mounted shoes attached thereto, rollers carried by said shoes to run between a pair of rails attached to the counter, means tending to move said shoes to hold the rollers in engagement with both of the rails, and a vertically adjustable post guided on said bracket.

2. A counter attachment for supporting a salesman's accessory, comprising the combination of a bracket, shoes pivotally mounted on said bracket, rollers carried by said shoes, to run between a pair of rails attached to the counter, a spring tending to move said shoes about their pivots to hold the rollers in engagement with both of the rails, and a vertically adjustable post guided on said bracket.

3. A counter attachment for supporting a saleman's accessory, comprising the combination of a bracket, a vertically adjustable post carried by said bracket, shoes pivotally mounted on said bracket, a roller carried on the pivotal axis of each of said shoes, another roller carried by each of said shoes at a point removed from the axis of rotation of each shoe, all of said rollers constructed to engage a pair of rails attached to the counter, and means tending to rotate said shoes about their pivots and operating to hold the rollers forcibly in engagement with the rails.

In testimony whereof I have hereunto set my hand.

WALTER E. HOSCH.